(12) United States Patent
Casagrande et al.

(10) Patent No.: US 10,575,059 B2
(45) Date of Patent: Feb. 25, 2020

(54) SYSTEMS AND METHODS FOR SYNCHRONIZATION OF TELEVISION CHANNEL DATA

(71) Applicant: DISH Technologies L.L.C., Englewood, CO (US)

(72) Inventors: Steven Michael Casagrande, Castle Pines, CO (US); John Card, II, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/215,445

(22) Filed: Jul. 20, 2016

(65) Prior Publication Data
US 2017/0034584 A1 Feb. 2, 2017

Related U.S. Application Data

(60) Provisional application No. 62/197,285, filed on Jul. 27, 2015.

(51) Int. Cl.
*H04N 21/482* (2011.01)
*G06F 16/783* (2019.01)
(Continued)

(52) U.S. Cl.
CPC ......... *H04N 21/4821* (2013.01); *G06F 16/74* (2019.01); *G06F 16/783* (2019.01); *H04N 21/4383* (2013.01); *H04N 21/44209* (2013.01); *H04N 21/458* (2013.01); *H04N 21/462* (2013.01); *H04N 21/472* (2013.01); *H04N 21/84* (2013.01)

(58) Field of Classification Search
CPC combination set(s) only.
See application file for complete search history.

(56) References Cited

U.S. PATENT DOCUMENTS

2007/0124775 A1 5/2007 DaCosta
2009/0260038 A1 10/2009 Acton et al.
(Continued)

FOREIGN PATENT DOCUMENTS

WO 00/52928 A1 3/2000

OTHER PUBLICATIONS

International Search Report and Written Opinion dated Sep. 27, 2016, for corresponding International Application No. PCT/US2016/043151, 13 pages.
(Continued)

*Primary Examiner* — Omar S Parra
(74) *Attorney, Agent, or Firm* — Seed IP Law Group LLP

(57) ABSTRACT

A television navigation device, such as a digital video recorder (DVR), searches for a television channel program lineup in an electronic program guide (EPG) of a service provider that matches the television channel program lineup for what the television navigation device understands to be that of a particular television channel. The television navigation device then assigns the particular television channel to the service provider's channel identifier of the matching television channel the EPG. This channel identifier will then be used by the television navigation device to command the receiving device associated with the service provider to tune to the particular television channel at the appropriate time.

26 Claims, 7 Drawing Sheets

| | Service Provider A | Service Provider B | Service Provider C | ... |
|---|---|---|---|---|
| "Y" Channel | 108 | 2 | 15 | ... |
| "Z" Channel | 34 | N/A | 164 | ... |
| . | . | . | . | ... |
| . | . | . | . | ... |
| . | . | . | . | ... |

(51) Int. Cl.
*G06F 16/74* (2019.01)
*H04N 21/438* (2011.01)
*H04N 21/442* (2011.01)
*H04N 21/458* (2011.01)
*H04N 21/462* (2011.01)
*H04N 21/472* (2011.01)
*H04N 21/84* (2011.01)

(56) References Cited

U.S. PATENT DOCUMENTS

| | | | |
|---|---|---|---|
| 2011/0067081 A1 | 3/2011 | Åström et al. | |
| 2014/0059615 A1* | 2/2014 | Sirpal | H04N 5/44 |
| | | | 725/52 |
| 2015/0095948 A1* | 4/2015 | Kummer | H04N 21/6143 |
| | | | 725/35 |
| 2016/0219323 A1* | 7/2016 | Gordhan | H04N 21/435 |

OTHER PUBLICATIONS

International Preliminary Report on Patentability for PCT/US2016/043151, dated Feb. 8, 2018, 9 pages.
Canadian Office Action for application 2,992,834 dated Nov. 14, 2018. 5 pages.

* cited by examiner

SYSTEMS AND METHODS FOR SYNCHRONIZATION OF TELEVISION CHANNEL DATA

BRIEF SUMMARY

In some example embodiments, a television navigation device such as a third party digital video recorder (DVR) can retrieve both A/V streams and television program data, such as electronic program guide (EPG) event data including program titles, start and stop times, from a receiving device associated with a service provider that is new to the television navigation device or from an Internet source. For example, a receiving device can be new to the television navigation device because it is the initial receiving device that the television navigation device is being connected to or because the user of the television navigation device is changing or adding service providers and introducing a receiving device associated with the new service provider. The television navigation device then uses that data to correlate what the television navigation device understands should be on a given television channel with labels or other identifying metadata that identifies that channel, with metadata relating to that channel, with recordings and scheduled recordings of content on that channel, and with alternate sources of that same channel.

In the present example, the television navigation device is using the receiving device as a source of linear content and has its own version of the guide stored previously to compare to the service provider's guide data. Once the television navigation device correlates the EPG event data with what the television navigation device understands should be on a given television channel, the television navigation device then assigns the service provider's channel identifier to the television channel and also optionally assigns a user-provided label as well. The television navigation device may then use the assigned channel identifier to navigate the receiving device associated with the service provider to the television channel at the appropriate time to record the content on the television channel.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
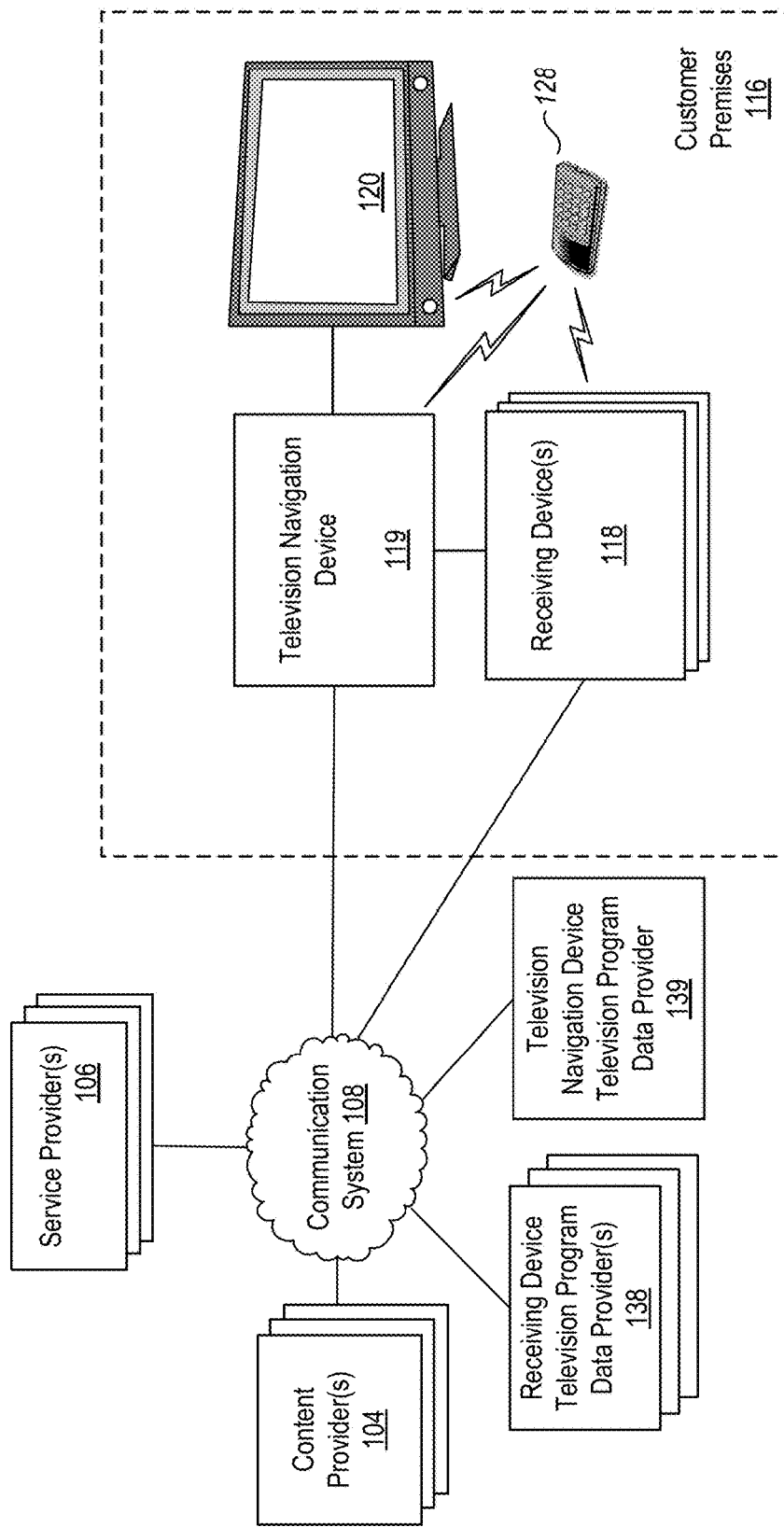
FIG. 1 is a block diagram illustrating an example content distribution environment in which embodiments of synchronization of television channel data may be implemented, according to one example embodiment.

Content distribution systems, such as cable, satellite and television distribution systems, arrange audio and video content in a listing of numerical television channel identifiers that are configured and managed by the content provider or service provider. The listing may be dynamic (e.g., a satellite service provider moves HBO Zone® from channel 300 to channel 400). That scenario is one of the problems solved by the present disclosure. In particular, the synchronization of television channel data described herein allows the television navigation device to discover where channels are located in the service provider's lineup, and to track them if they move.

A television channel as used herein refers to single program/content service (e.g., CNN®, HBO Zone®, CSPAN®) and particularly to a single linear lineup of television programs over time. Television programs may include, but are not limited to: television shows, streaming media content, movies, on demand programs, pay-per-view programs, music, video, and audio programming.

There are many situations where a subscriber's television navigation device may need to discover where television channels are located in the service provider's lineup. As a first example, a user may buy a digital video recorder (DVR), which is one example of a television navigation device, and connect it to the service provider for the first time. The DVR may present its own user interface (UI) with its own independent guide, and it may need to synchronize its own guide with the service provider's lineup. Thus, the subscriber may be introducing a television navigation device into the system that is not aware of the channel identifiers of the current service provider for the channels the subscriber desires to record or tune to. Due to the large quantity of channels carried on both any previous and current services, the amount of time required for a subscriber to manually enter such channel identifiers in very large.

As a second example, a service provider may move channels, perhaps moving just one channel, to a new channel identifier. Additionally, when a subscriber switches service from one service provider to another, or adds a content provider, while the content may still be the same, the channel identifiers are often different. This is similar to a move as described above, but for the entire channel lineup, or the commonly overlapping channels in both lineups. For example, a specific sports channel may be accessible on channel 210 of a first service content provider and channel 227 of a second service provider. However, subscriber may have had their digital video recorder (DVR), digital media streaming device, or other television navigation device programmed to tune to, or have the set-top box (STB) tune to, the channel identifiers of the previous service provider. "Tune to" as used herein includes to connect to a particular television channel in any manner, including finding and/or selection of a particular frequency or television signal of a particular television channel; to select a particular stream of data having particular television programming content; to select from an Internet Protocol (IP) multicast datastream(s); and/or to connect to a Uniform Resource Locator (URL) that streams the content. In all the above example scenarios, it is desirable for the television navigation device to learn or find out the appropriate channel identifiers in order to initially operate or to continue operating seamlessly.

To address the above problems, in one example embodiment, in order to have the television navigation device understand which channel it should request from the STB, the television navigation device matches the STB-provided electronic program guide (EPG) data (event-level data) with the television navigation device's internal guide. This may include event titles, descriptions of programs, durations, start/end times, parental control information, etc. The descriptions of programs may include, but are not limited to, items such as: plot description, actor identification, director identification, credit information, original air date identification, series identification, episode identification, season identification, review information, program data size, video resolution or quality level, etc. For example, once the television navigation device finds a match for its concept of HBO Zone®, the television navigation device then remembers that HBO Zone® is on channel 300, and can use this data to instruct the STB to tune to channel 300 at the appropriate time. The television navigation device can re-scan the STB-provided EPG periodically, or perhaps check on each channel change, to make sure the channel has not been moved or removed in the EPG of the STB.

In some embodiments, the system may identify that some channels are missing or otherwise not available from a particular service provider and then ask for user intervention or provide notification to the user to address the issue. For example, the user may select to ignore that missing channel, choose to delete recordings previously set for that channel, instruct the system to find similar programming or channels, or take some other action. However, in other embodiments, the system may verbosely or silently fail when some channels are missing or otherwise not available from the particular service provider or just provide blank information for that missing channel.

FIG. 1 is an overview block diagram illustrating a content distribution environment in which embodiments of synchronization of television channel data may be implemented, according to one example embodiment.

Before providing additional details regarding the operation and constitution of methods and systems for synchronization of television channel data, the example content distribution environment 102, within which such a receiving device may operate, will briefly be described.

In the content distribution environment 102, audio, video, and/or data service providers, such as one or more television service providers 106, provide their customers a multitude of video and/or data programming (hereafter, collectively "programming"). Such programming is often provided on television channels by use of one or more receiving devices represented by receiving device 118 associated with one or more respective service providers 106. The one or more receiving devices 118 are communicatively coupled to a presentation device 120 configured to receive the programming (or to one or more additional respective separate presentation devices, not shown). The programming may include any type of media content, including, but not limited to: television shows, news, movies, sporting events, advertisements, streaming media content, on demand programs, pay-per-view programs, music, video, and audio programming etc.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 may process and communicate the selected programming to the presentation device 120 directly or through a television navigation device 119 as shown in FIG. 1.

For convenience, examples of a receiving device 118 may include, but are not limited to, devices such as: a "television converter," "receiver," "set-top box," "television receiving device," "television receiver," "television recording device," "satellite set-top box," "satellite receiver," "cable set-top box," "cable receiver," "media player," "digital video recorder" and/or "television tuner." Accordingly, the receiving device 118 may be any suitable converter device or electronic equipment that is operable to receive or playback programming. Further, the receiving device 118 may itself include user interface devices, such as buttons or switches. In many applications, a remote-control device ("remote") 128 is operable to control the receiving device 118, the television navigation device 119 and/or the presentation device 120. The remote 128 typically communicates with the receiving device 118 using a suitable wireless medium, such as infrared ("IR"), radio frequency ("RF"), or the like.

The television navigation device 119 may be a device that is communicatively coupled to the receiving device 118 and is able to command the receiving device 118 to tune to, or may itself tune to, particular channels using channel identifiers. In some embodiments, the television navigation device 119 may be coupled to the presentation device 120 as shown in FIG. 1 and send to the presentation device 120 the particular channels that the receiving device 118 is tuned to and/or the recorded content for display on the presentation device 120. The television navigation device 119 may present its own user interface (UI) with its own independent guide on the presentation device 120, and thus may need to synchronize its own guide with that of the service provider 106.

For example, the television navigation device 119 may be digital video recorder (DVR), digital media streaming device, or other device programmed to command the receiving device 118 to tune to channels using particular channel identifiers at particular times in order to receive such programming from the receiving device 118. The television navigation device 119 may possibly record, send, reformat, analyze or otherwise perform operations regarding the programming. In some embodiments, the television navigation device 119 may be a device that is able to operate, or operate with, many different types of receiving devices from different manufacturers and different service providers using a common application programming interface (API) or specific APIs for particular receiving devices to communicate with and control such receiving devices.  In some embodiments, the television navigation device 119 may be one or more of: a DVR, a media player, a streaming media player, a set-top box, a mobile device, a tablet computing device a computer, a smart television and a remote control device. A guide for television channel navigation may be displayed on the presentation device 120 connected to the television navigation device 119 or, in some embodiments, on the television navigation device 119 itself. For example, the television navigation device 119 may be a DVR connected the presentation device 120 on which both a guide for television channel navigation and the television programming are displayed. In other embodiments, the television navigation device 119 may be a mobile device such as a phone or tablet and the presentation device 120 is connected to the receiving device 118. In this case, the guide for television channel navigation may be displayed on the mobile device and the television programming may be displayed on the presentation device 120**.

Examples of a presentation device 120 may include, but are not limited to: a television ("TV"), a monitor, a personal computer ("PC"), a sound system receiver, a DVR with attached display, game system, or the like. The presentation device 120 could be combined with the television navigation device 119, for example, such as the television navigation device 119 being a PC or tablet that has its own display built in. Alternatively, television navigation device 119 could be combined with the presentation device 120, such as a smart television having a built in DVR. For example, if the presentation device 120 has a built in DVR, then this may be the television navigation device 119 being built in to the presentation device 120. In these cases, the presentation device 120 and the television navigation device 119 would be the same device. In other embodiments, if the presentation device 120 includes a built in DVR, then this built in functionality may be in addition to the television navigation device 119.

Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. In some embodiments, one or more presentation devices 120 are communicatively coupled, directly or indirectly, to the television navigation device 119 as shown in FIG. 1. Further, the receiving device 118, television navigation device 119 and/or the presentation device 120 may be integrated into a single device. Such a single device may have the above-described functionality of the receiving device 118, television navigation device 119 and/or the presentation device 120, or may even have additional functionality.

One or more content providers 104 may have computerized systems that provide program content, such as television programming, to one or more respective service providers 106, for example, to one or more multichannel video programming distributors (MVPDs). Example content providers include television stations which provide local or national television programming and special content providers which provide premium based programming or pay-per-view programming. Accordingly, as shown in FIG. 1, reference to service provider 106 may refer to one or more service providers. In particular, there may be one or more service providers, represented by reference to service provider 106, that each receive content from a respective content provider 106 and each provide their own television program data for television programming provided on a plurality of television channels. For example, each service provider 106 may provide or be associated with the service provider's own electronic program guide that includes television channel lineups for the same television channels as other service providers. However, in many cases, each service provider 106 uses different television channel identifiers from other service providers for television channel navigation for some or all of the same television channels. In some embodiments, there may be multiple receiving devices connected to television navigation device 119 on the customer premises 116, each receiving service from a different service provider 106. For example, one or more receiving devices 118 may receive service from one or more respective different service providers 106 which each receive content from respective content providers 104. In some embodiments one receiving device 118 may receive content from one or more multiple different service providers 106 and/or directly from one or more multiple different content providers 104.

Program content is communicated to a system of a service provider of the one or more service providers 106 from a respective content provider of the one or more content providers 104 through suitable communication media, generally illustrated as communication system 108 for convenience. Communication system 108 may include many different types of communication media, now known or later developed. Non-limiting media examples include telephone systems, the Internet, internets, intranets, cable systems, fiber optic systems, microwave systems, asynchronous transfer mode (ATM) systems, local area networks (LANs), frame relay systems, digital subscriber line (DSL) systems, radio frequency (RF) systems, and satellite systems.

In at least one embodiment, the received program content is converted by a computerized system of the service provider 106 into a suitable signal (a "program signal") that is ultimately communicated to the receiving device 118 and/or television navigation device 119. Other embodiments of the receiving device 118 and television navigation device 119 may receive programming from service providers 106 and/or content providers 104 via locally broadcast RF signals, cable, fiber optic, Internet media, streaming media, or the like.

In addition, receiving device television program data provider 138 may have computerized systems that provide various forms of content and/or services to various receiving devices 118 residing in the customer premises 116. For example, receiving device television program data provider 138 may also provide metadata or other information to the receiving device 118 regarding television programming that has occurred and/or will occur on various television channels. For example, receiving device television program data provider 138 may provide to the receiving device 118 television program data for television programming provided on a plurality of television channels available from the service provider 106. Reference to receiving device television program data provider 138 may also refer to one or more receiving device television program data providers. For example, in some embodiments, there may be one receiving device television program data provider 138 associated with each service provider 106. Such television program data may include one or more of, for each of a plurality of television channels: program titles; start times for programs; end times for programs; descriptions of programs; duration of programs; and parental control information for programs or television channels. The descriptions of programs may include, but is not limited to, items such as: plot description, actors, original air date, series, episode, season, review information, program data size, video resolution or quality level, etc. For example, such television program data may be provided in the form of electronic program guide (EPG) data for the service provider 106 or another service provider. Also, such data may instead or also be provided directly by the service provider 106.

In an example embodiment, service provider 106 or receiving device television program data provider 138 communicates over communication system 108 television program data in the form of electronic program guide (EPG) data of the service provider 106 to the receiving device 118. For example, receiving device television program data provider 138 may communicate over communication system 108 television program data in the form of electronic program guide (EPG) data to an associated service provider 106. The service provider 106 then sends the EPG data to the receiving device 118. Receiving device 118 may send such EPG data of the service provider 106 to the television navigation device 119. Receiving device 118 may also send the channel identifiers for those television channels in the EPG. Television navigation device 119 may receive over communication system 108 its own set of television program data for the same television channels from a different television program data provider, such as television navigation device television program data provider 139 or may have such data already stored on the television navigation device 119. Television navigation device 119 may then compare the received EPG data to its own set of television program data for the same television channels to determine which channel identifiers of the service provider 106 correspond to which channels from its own set of television program data. Although communication system 108 represents various different types of communication media, not all the different types of communication media represented by communication system 108 need be interconnected. For example, not all data communicated over communication system 108 needs to travel on the same physical or logical network. In some embodiments, data communicated over communication system 108 from receiving device television program data provider 138 to the service provider 106 and from the service provider 106 to the receiving device 118 travels over a different physical or logical network, or different parts of a physical or logical network, than data communicated over communication system 108 from television navigation device television program data provider 139 to the television navigation device 119.

In some embodiments, the television navigation device 119 may receive the television program data (e.g., EPG data) and channel identifiers for the service provider 106 directly from the service provider 106. In such an embodiment, service provider 106 may be a third party data aggregator that aggregates television program data from various television program data providers, content providers and/or other service providers. In one example embodiment, one or more content providers 104 and/or one or more receiving device television program data providers 138 may receive information from the receiving device 118 and/or the television navigation device 119, such as which channel identifiers of the service provider 106 in the local area in which customer premises 119 is located correspond to which television channels. In some embodiments, the television navigation device television program data provider 139 may also receive such data.

The above description of the content distribution environment 102, the customer premises 116, and the various devices therein, is intended as a broad, non-limiting overview of an example environment in which various embodiments of synchronization of television channel data may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement synchronization of television channel data. Other embodiments of the described techniques may be used for other purposes, including synchronization of television channel data provided to other receiving devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
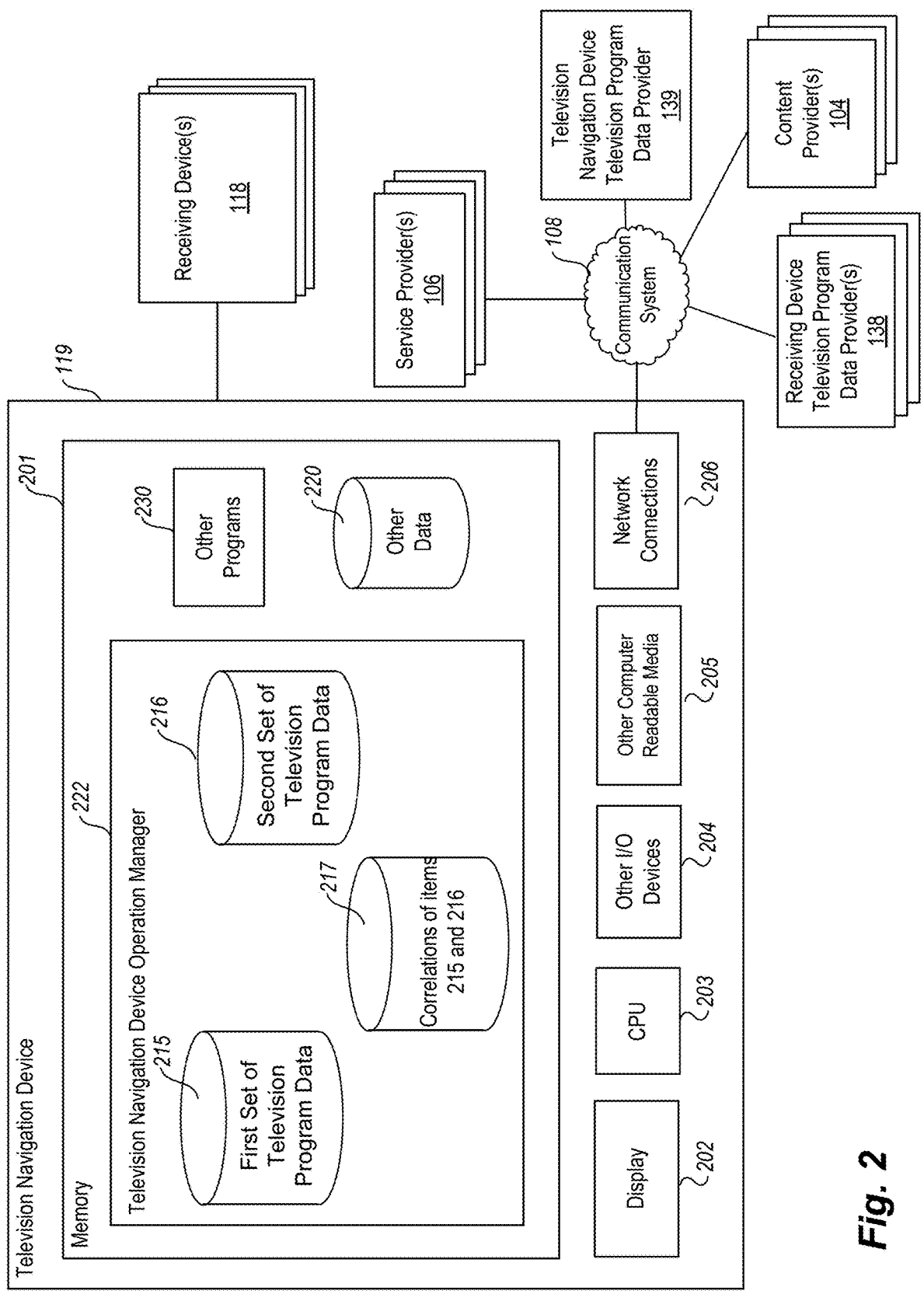
FIG. 2 is a block diagram illustrating elements of an example television navigation device used in synchronization of television channel data, according to one example embodiment.

FIG. 2 is a block diagram illustrating elements of an example television navigation device 119 used in synchronization of television channel data, according to one example embodiment. Some or all of such elements may also comprise or be included in the receiving device 118 and/or presentation device 120.

In one embodiment, television navigation device 119 is a DVR configured to receive and record television programming. In other embodiments, the television navigation device 119 may be any device that is communicatively coupled to the receiving device 118 that is able to command the receiving device 118 to tune to, or may itself tune to, particular channels using channel identifiers. For example, the television navigation device 119 may be a digital media streaming device or other device programmed to command the receiving device 118 to tune to television channels (including streaming media channels) using particular channel identifiers at particular times in order to receive such programming from the receiving device 118. The television navigation device 119 may possibly record, send, reformat, analyze or otherwise perform operations regarding the received television programming. In some embodiments, the television navigation device 119 may be a device that is able to operate, or operate with, many different types of receiving devices from different manufacturers and different service providers using a common application programming interface (API) or specific APIs for particular receiving devices to communicate with and control such receiving devices. In some embodiments, the television navigation device 119 may be one or more of: a DVR, a media player, a streaming media player, a set-top box, a mobile device, a tablet computing device a computer, a smart television and a remote control device.

The television navigation device 119 may need to control a STB such as receiving device 118, for example, to tune to a desired television channel. However, there may be no standard way of identifying a given television channel, for example, HBO Zone®. Some service providers may call it "HBO Zone", some may call it "HBO", "HBOE", or "HBO-E", or "HBO-HD", etc. This would mean that the television navigation device 119, when trying to tune to HBO Zone®, would not know HBO Zone® is on channel identifier 300 for Dish® and channel identifier 501 for DirecTV®, as such service providers name them differently, and they may move the channels periodically for business reasons. In some embodiments, the television navigation device 119 can retrieve the television program data, such as EPG event data, from the receiving device 118 via an API, store it in as a first set of television program data 215 and use that data to correlate with what the television navigation device 119 understands should be on a given channel. Such television program data 215 data may be stored for various different time periods on the television navigation device 119 in various different embodiments. For example, in some embodiments, storage of EPG data on the television navigation device 119 is done "on the fly", without long-term storage of the data on television navigation device 119. The television navigation device understands what should be on a given channel by accessing a second set of television program data. Once the television navigation device 119 correlates the EPG event data with what the television navigation device 119 understands should be on a given channel, the television navigation device 119 then assigns channel identifier 300 to the television navigation device's "HBO" channel. These correlations may be stored as correlations 217 in the television navigation device 119. In the present example, the television navigation device 119 has its own guide data stored as the second set of television program data 216, and is using the receiving device 118 as a source of linear content.

Typically, the television navigation device 119 is not provided by the service provider 106, but the receiving device 118 is. Thus, this capability enables the television navigation device 119 to connect to the receiving device 118 and tune to channels as it desires, without a user having to manually enter in "HBO=300" on the television navigation device 119, as the television navigation device 119 could discover the television channel lineup from the EPG data of the service provider 106 stored as the first set of television program data 215 without relying on what the service provider 106 named the channel in the service provider's EPG (which is certainly different across different service providers).

In some embodiments, the television navigation device 119 determines which of the television channels provided by the service provider corresponds which television channels for which the television navigation device 119 has stored television program data additionally based on whether the determined signal quality level of the of television channels provided by the service provider matches a signal quality level of channels for which the television navigation device 119 has stored television program data. The television navigation device 119 may analyze the television signal itself for the television channels provided by the service provider in order to do this. The signal quality level may refer to one or more of: digital video format, digital video resolution, video aspect ratio, number of pixels, bandwidth requirements, signal speed, connection speed requirements, video signal refresh rate, frame rate, dynamic range and color space.

A device such as television navigation device 119 that may in some embodiments not be provided by the service provider 106 may be required to be able to have access to television programming provided by service provider 106. When a new service provider and possibly a new receiving device is being used, the systems and methods for television data synchronization described herein enable the television navigation device 119 to access such television programming of the new service provider without the user having to manually re-enter the channel identifiers for television programming that the television navigation device 119 had been previously programmed to have the receiving device 118 tune to.

Note that one or more general purpose or special purpose computing systems/devices may be used to operate the television navigation device 119; store information regarding the television navigation device 119, the first set of television program data 215, the second set of television program data 216 and correlations 217 of the first set of television program data 215 and the second set of television program data 216; and communicate with the receiving device 118, the service provider 106, content provider 104, television navigation device television program data provider 139 and/or receiving device television program data provider 138. In addition, the television navigation device 119 may comprise one or more distinct computing systems/devices and may span distributed locations. Furthermore, each block shown may represent one or more such blocks as appropriate to a specific embodiment or may be combined with other blocks. Also, the television navigation device operation manager 222 may be implemented in software, hardware, firmware, or in some combination to achieve the capabilities described herein, using one or more devices in the home, outside the home, or some combination of inside and outside the home.

In the embodiment shown, television navigation device 119 comprises a computer memory ("memory") 201, a display 202 (which may act as presentation device 120 or be a different display in addition to presentation device 120), one or more Central Processing Units ("CPU") 203, Input/Output devices 204 (e.g., keyboard, mouse, RF or infrared receiver, light emitting diode (LED) panel, or liquid crystal display (LCD), USB ports, other communication ports, and the like), other computer-readable media 205, and network connections 206. The television navigation device operation manager 222 is shown residing in memory 201. In other embodiments, some portion of the contents and some, or all, of the components of the television navigation device operation manager 222 may be stored on and/or transmitted over the other computer-readable media 205. The components of the television navigation device 119 and operation manager 222 preferably execute on one or more CPUs 203 and facilitate the receiving, decoding, processing, selecting, recording, playback and displaying of programming, as described herein. The television navigation device operation manager 222 also facilitates the television data synchronization methods described herein and the recording and storage of information regarding the television navigation device 119, the first set of television program data 215, the second set of television program data 216 and correlations 217 of the first set of television program data 215 and the second set of television program data 216. The television navigation device operation manager 222 also facilitates communication with peripheral devices, via the I/O devices 204 and with remote systems (e.g., the content provider 104, the service provider 106, and/or the television navigation device program data provider 139) via the network connections 206. Television navigation device 119 may also or instead communicate with third party data aggregator that aggregates television program data from various television program data providers, content providers and/or other service providers. In some embodiments, television navigation device program data provider 139 and/or service provider 106 may be such a third party data aggregator. In some embodiments, the television navigation device operation manager 222 sends signals to the receiving device 118 to cause the receiving device 118 to tune to a particular channel identifier at particular times according to timers, configuration and/or other programming of the television navigation device operation manager 222. Which channel identifiers to use may be stored in the correlations 217, for example. Recorded programming may reside on the other data repository 220.

Also, the television navigation device operation manager 222 may interact via the communication system 108 with other devices. For example, the other device may be a home computing system (e.g., a desktop computer, a laptop computer, etc.) that includes or has access to (e.g., via communication system 108) the functionality of the content provider 104, television navigation device program data provider 139 and/or service provider 106.

Other code or programs 230 (e.g., an audio/video processing module, a program guide manager module, a Web server, and the like), and potentially other data repositories, such as data repository 220 for storing other data (user profiles, preferences and configuration data, DVR recording, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the television navigation device 119 and television navigation device operation manager 222 includes an application program interface ("API") that provides programmatic access to one or more functions of the television navigation device 119 and television navigation device operation manager 222. For example, such an API may provide a programmatic interface to one or more functions of the television navigation device operation manager 222 that may be invoked by one of the other programs 230, the content provider 104, television navigation device program data provider 139, service provider 106, or some other module. In this manner, the API may facilitate the development of third-party software, such as user interfaces, plug-ins, adapters (e.g., for integrating functions of the television navigation device operation manager 222 and television navigation device program data provider 139 into desktop or mobile device applications), and the like to facilitate synchronization of television channel data as described herein using the television navigation device 119.

In an example embodiment, components/modules of the television navigation device 119 and television navigation device operation manager 222 are implemented using standard programming techniques. For example, the television navigation device operation manager 222 may be implemented as a "native" executable running on the CPU 203, along with one or more static or dynamic libraries. In other embodiments, the television navigation device 119 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the television navigation device 119 to perform the functions of the television navigation device operation manager 222. In one embodiment, instructions cause the CPU 203 or some other processor, such as an I/O controller/processor, to retrieve and analyze television program data for a plurality of television channels and synchronize the television program data as described herein. For example, the instructions may cause the CPU 203 or some other processor, such as an I/O controller/processor to correlate the television program data to the television program data stored on the television navigation device 119 by comparing such data as: program titles for programs broadcast on the plurality of television channels; start times for programs broadcast on the plurality of television channels; end times for programs broadcast on the plurality of television channels; descriptions for programs broadcast on the plurality of television channels; duration of programs broadcast on the plurality of television channels and parental control information for one or more for programs broadcast on the plurality of television channels. The descriptions of programs may include, but is not limited to, items such as: plot description, actors, original air date, series, episode, season, review information, program data size, video resolution or quality level, etc.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a television navigation device operation manager 222 implementation. Also, other functions could be implemented and/or performed by each component/module, and in different orders, and by different components/modules, yet still achieve the functions of the television navigation device 119 and operation manager 222.

In addition, programming interfaces to the data stored as part of the television navigation device 119 and operation manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The first set of television program data 215, the second set of television program data 216 and correlations 217 of the first set of television program data 215 and the second set of television program data 216 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 222.

Furthermore, in some embodiments, some or all of the components of the television navigation device 119 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations. For example, the data stored as recorded programming in data repository 220 in the television navigation device 119 may instead or also be stored in "the cloud" such as on a server remote from the television navigation device 119 that is accessible by the television navigation device 119 over communication system 108 or directly accessible by the presentation device 120 or receiving device 118 over communication system 108. As another example, the data stored as correlations 217 in the television navigation device 119 may instead or also be stored on a server remote from the television navigation device 119 that is accessible by the television navigation device 119 over communication system 108 or directly by the presentation device 120 or receiving device 118 over communication system 108.

Figure 3:
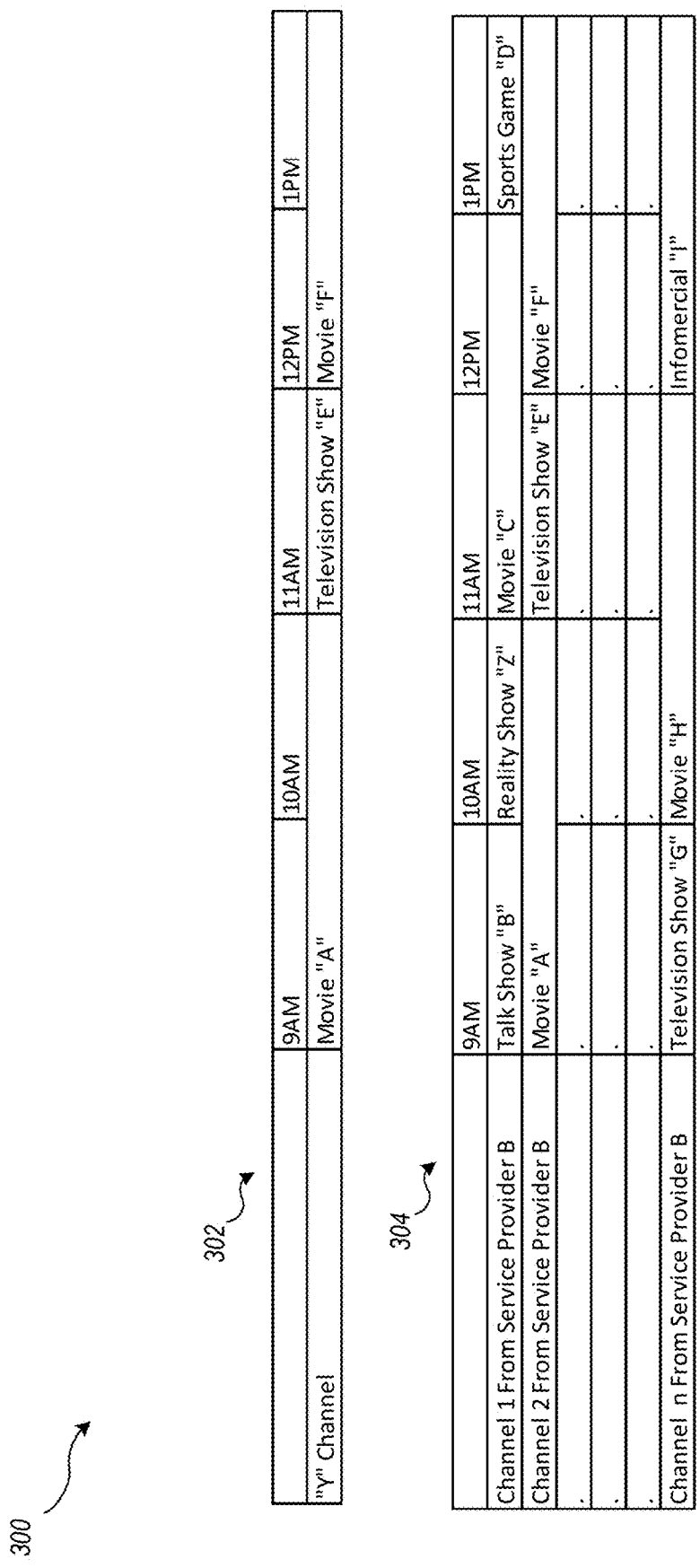
FIG. 3 is a diagram of a representation of example television program data for television programming that may be used in synchronization of television channel data, according to one example embodiment.

FIG. 3 is a diagram of a representation of example television program data 300 for television programming that may be used in synchronization of television channel data, according to one example embodiment. For example, the television navigation device 119 may store television program data 302 indicating television program titles and corresponding start and stop times for such television programs for what television navigation device 119 understands to be the "Y" channel. When a new service provider (e.g., service provider B) is being used by a customer using the television navigation device 119, the television navigation device 119 may retrieve from the customer's receiving device associated with service provider B, or from service provider B, the television program data 304 indicating television program titles and corresponding start and stop times for such television programs on various different television channels of service provider B. For example, this may be the EPG data of service provider B. The television navigation device 119 then searches the television program data 304 for a television channel program lineup that matches the television channel program lineup for what the television navigation device 119 understands to be that of the "Y" channel as shown in television program data 302. In this example, the matching data is of the television channel provided by the service provider B having channel identifier 2 as shown in the television channel program data 304. The television navigation device 119 may then assign the "Y" channel to channel identifier 2, which will be used to command the receiving device associated with service provider B to tune to the "Y" channel at the appropriate time. The television navigation device 119 may also store the identification of service provider B as having channel identifier 2 assigned to the "Y" channel. Such data may also be communicated to the television navigation device program data provider 139, which may in some embodiments act as a third party data aggregator, or directly to other television navigation devices, service providers and/or receiving devices to be shared with other television navigation devices, service providers and/or receiving devices such that those devices may save time by not having to perform the same comparison step.

Figure 4:
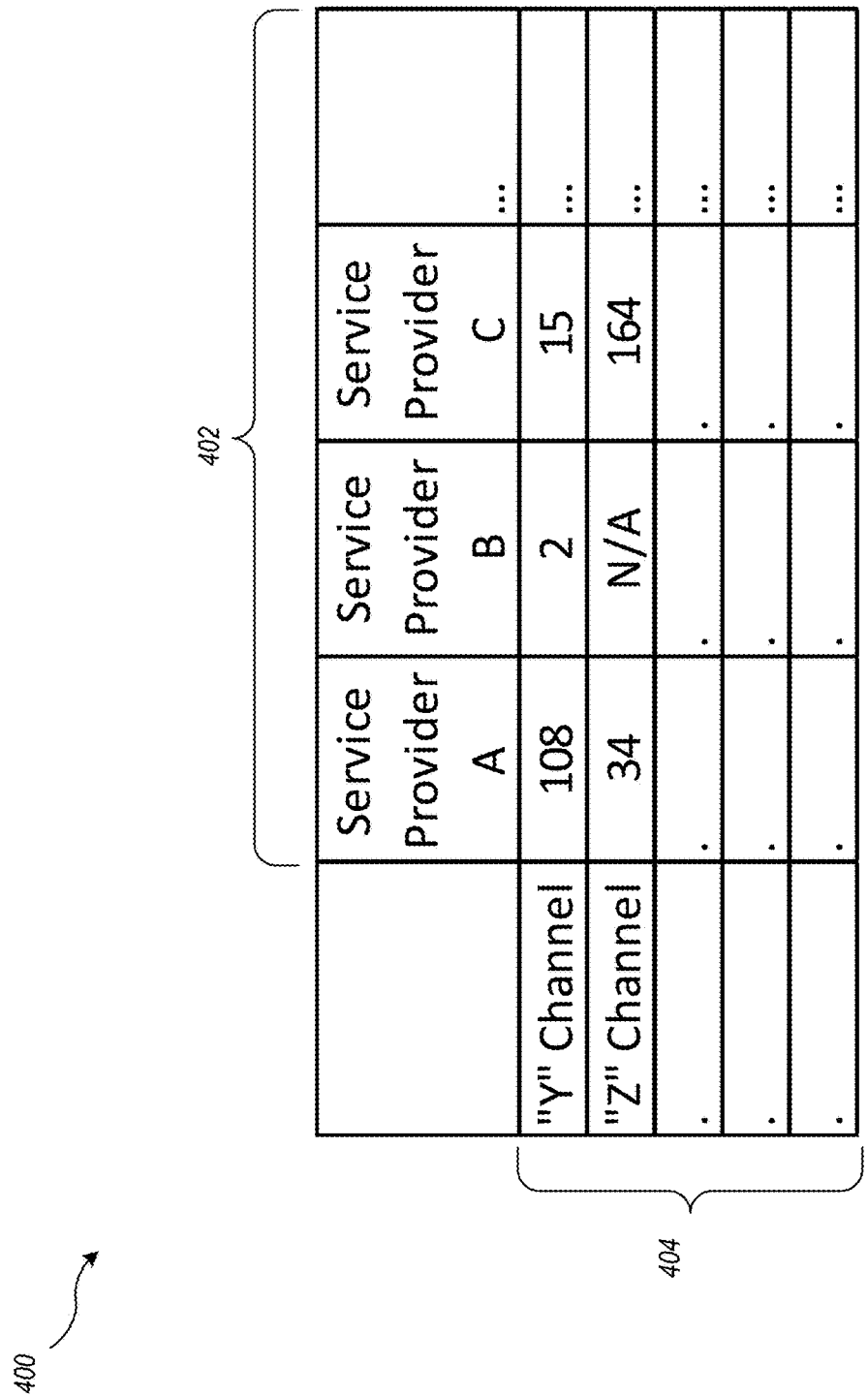
FIG. 4 is a table indicating example different channel identifiers for the same channels available from different service providers, according to one example embodiment.

FIG. 4 is a table 400 indicating example different channel identifiers for the same channels available from different service providers, according to one example embodiment. Shown are the various different television channels 404 and the corresponding channel identifiers 402 assigned to those various different television channels by different service providers. This data may be generated, for example, as a result of the television navigation device 119 searching the television program data 304 for television channel program lineups that match what the television navigation device 119 understands to be the television channel program lineups of various television channels (e.g., that of "Y" channel and the "Z" channel. etc.). Based on the example shown in FIG. 3, shown is data indicating that the television navigation device 119 assigned the "Y" channel to channel identifier 2 for service provider B, which will be used to command the receiving device associated with service provider B to tune to the "Y" channel at the appropriate time. There may be embodiments where a particular service provider does not carry a particular television channel and that cell or data field for that television channel would be blank, perhaps say "N/A" (as indicated in FIG. 4 with the example that service provider B does not carry the "Z" channel), be empty, or otherwise indicate the particular service provider does not carry a particular television channel. Such television program data may also be communicated to the television navigation device program data provider 139, which may in some embodiments act as a third party data aggregator, or directly to other television navigation devices, service providers, and/or receiving devices to be shared with other television navigation devices, service providers and/or receiving devices such that those devices may save time by not having to perform the same comparison step performed by television navigation device 119 to generate such data. Also, some or all of the correlations and other similar correlations shown in table 400 may be determined by, received by, and/or stored by the content provider 104, television navigation device program data provider 139, which may in some embodiments act as a third party data aggregator, and/or service provider 106, which may also in some embodiments act as a third party data aggregator.

Figure 5:
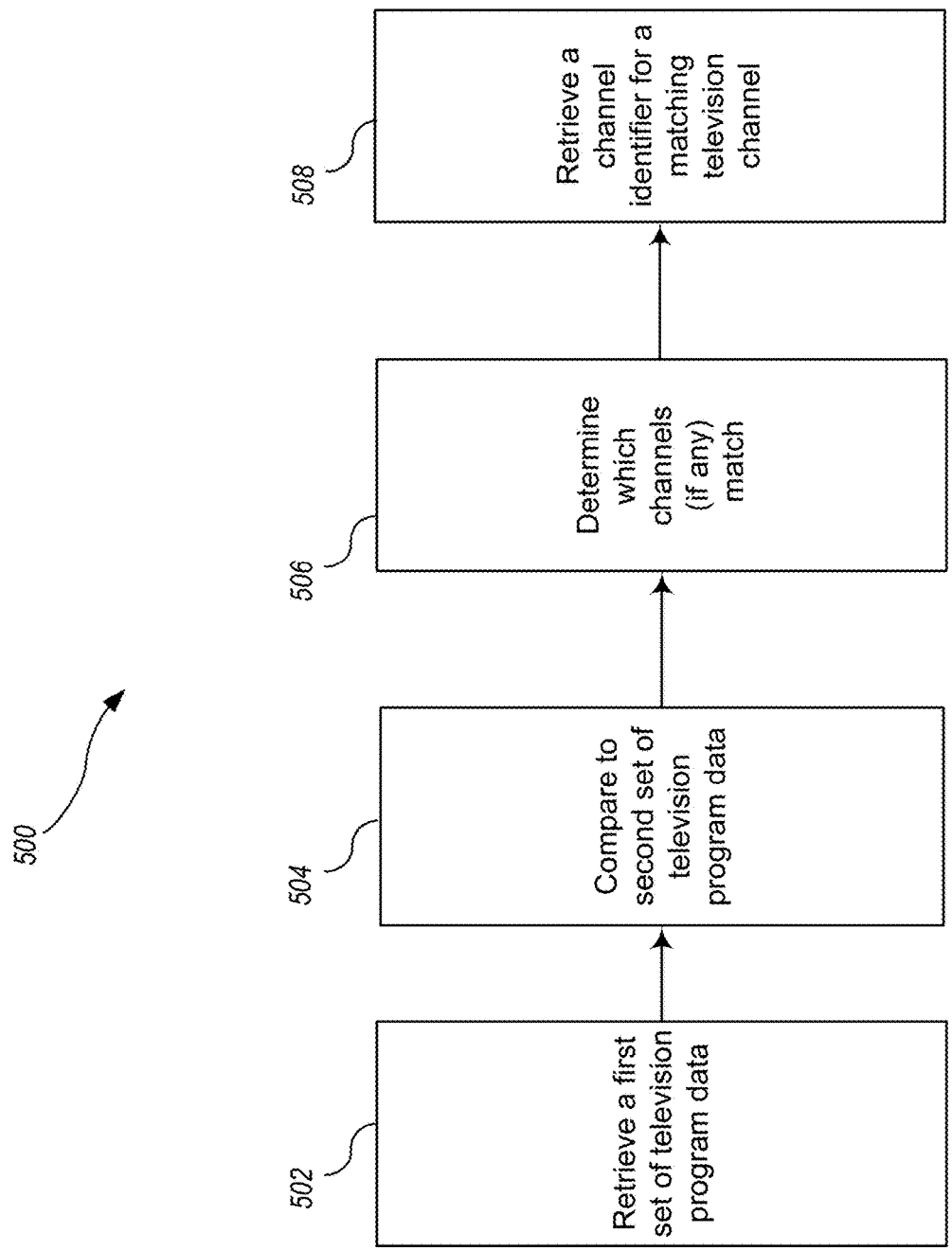
FIG. 5 is a flow diagram of a method of synchronization of television channel data, according to one example embodiment.

FIG. 5 is a flow diagram of a method 500 of synchronization of television channel data, according to one example embodiment.

At 502, the system retrieves a first set of television program data for television programming provided on a plurality of television channels.

At 504, the system compares the retrieved first set of television program data for television programming provided on the plurality of television channels to a second set of television program data for television programming provided on a requested television channel.

At 506, the system, in response to the comparison, determines which one of the plurality of television channels (if any) matches the requested television channel based on the comparison of the retrieved first set of television program data for television programming provided on the plurality of television channels to the second set of television program data for television programming provided on the requested television channel.

At 508, the system, in response to the determination, retrieves a channel identifier for the one of the plurality of television channels that matches the requested television channel, the channel identifier associated with a first service provider that provides access to the plurality of television channels.

Figure 6:
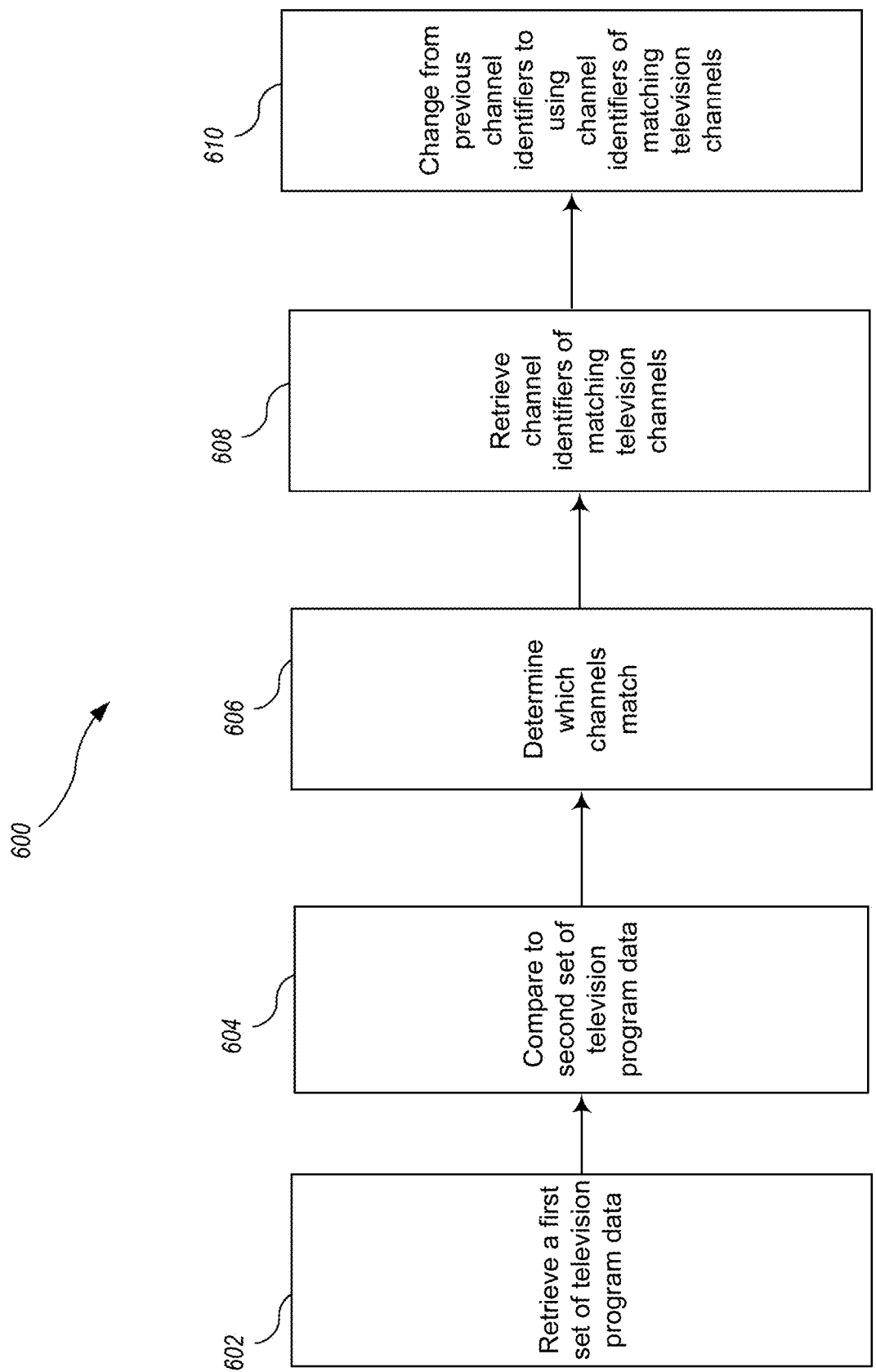
FIG. 6 is a flow diagram of a method of synchronization of television channel data, according to another example embodiment.

FIG. 6 is a flow diagram of a method 600 of synchronization of television channel data, according to another example embodiment.

At 602, the system retrieves a first set of television program data for television programming provided on a first plurality of television channels.

At 604, the system compares the retrieved first set of television program data for television programming provided on the first plurality of television channels to a second set of television program data for television programming provided on a second plurality of television channels.

At 606, the system determines which channels of the first plurality of television channels matches which channels of the second plurality of television channels based on the comparison.

At 608, the system changes from using previous channel identifiers for tuning to the second plurality of television channels to using the channel identifiers for the channels of the first plurality of television channels that match channels of the second plurality of television channels for tuning to the second plurality of television channels.

At 610, the system retrieves channel identifiers for the channels of the first plurality of television channels that match channels of the second plurality of television channels, the channel identifiers associated with a first service provider that provides access to the first plurality of television channels.

Figure 7:
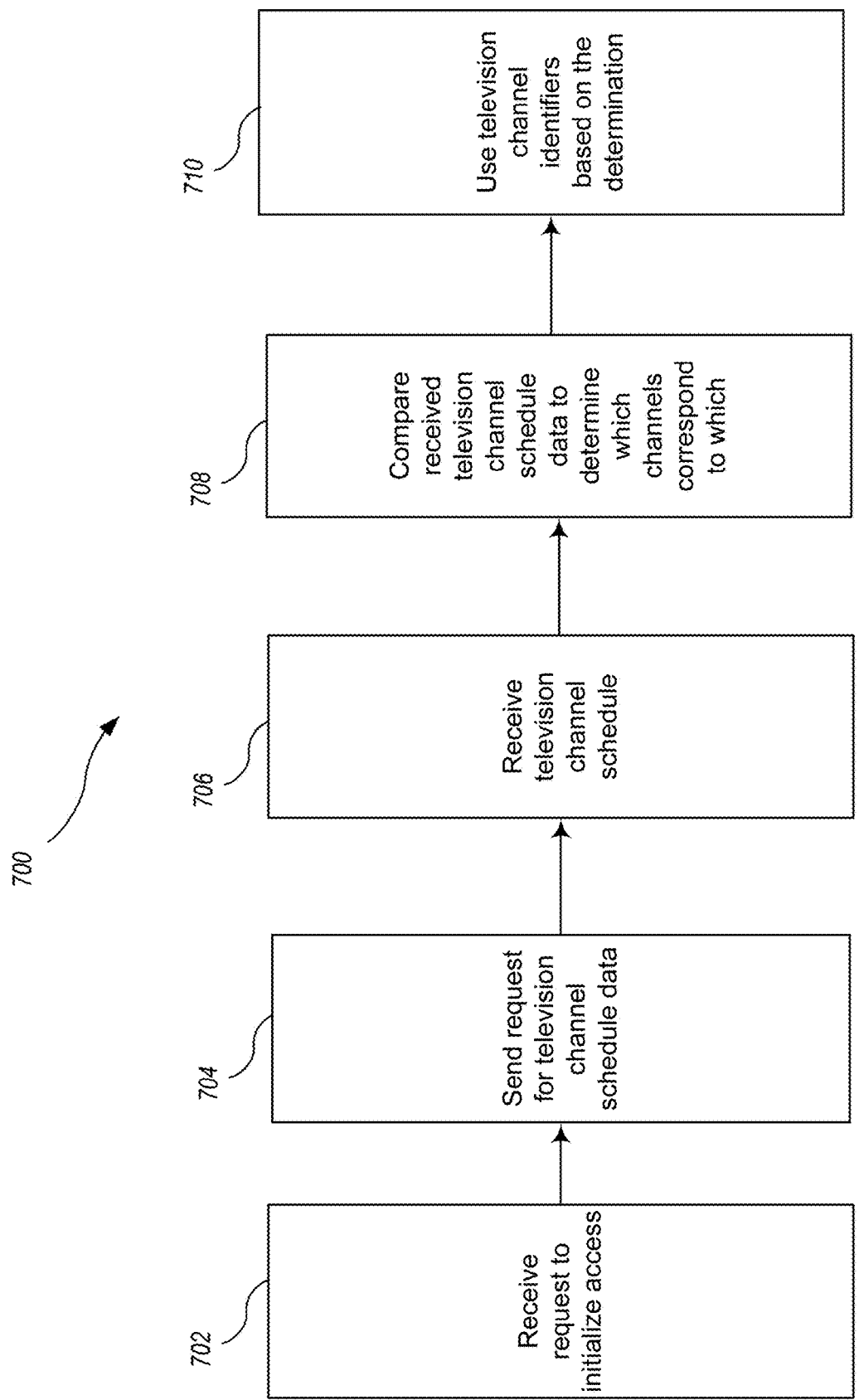
FIG. 7 is a flow diagram of a method of synchronization of television channel data, according to yet another example embodiment.

FIG. 7 is a flow diagram of a method 700 of synchronization of television channel data, according to yet another example embodiment.

At 702, the system receives a request to initialize access to a plurality of television channels. For example, the receiving device may be the initial receiving device the television navigation device will be connected to. Thus, such an operation may occur during an initial setup after a user purchases a television navigation device, such as a DVR, and connects it to the service provider for the first time. In particular, the DVR may present its own UI with its own independent guide, and the DVR may need to synchronize its own guide with the service provider's schedule of television programming.

At 704, the system, in response to the request, sends a request for television channel schedule data and corresponding television channel identifiers for television channels provided by a service provider.

At 706, the system receives television channel schedule data and corresponding television channel identifiers for television channels provided by the service provider in response to the request.

At 708, the system compares the received television channel schedule data to television channel schedule data for the plurality of television channels to determine which of the television channels provided by the service provider correspond to which television channels of the plurality of television channels.

At 710, the system uses the television channel identifiers for television channels provided by the service provider to tune to the corresponding television channels of the plurality of television channels based on the determination of which of the television channels provided by the service provider correspond to which television channels of the plurality of television channels.

While various embodiments have been described hereinabove, it is to be appreciated that various changes in form and detail may be made without departing from the spirit and scope of the invention(s) presently or hereafter claimed.

The invention claimed is:

1. A computer-implemented method comprising:
searching, by at least one computer processor, for a television channel program lineup in an electronic program guide (EPG) of a new service provider that matches a television channel program lineup that a television navigation device expects to be on the television channel based on a previous service provider by at least:
retrieving, by at least one computer processor, a first set of television program data in the EPG of the new service provider for television programming provided on a plurality of television channels of the new service provider;
retrieving, by at least one computer processor, a second set of television program data for television programming provided on a requested television channel of the previous service provider;
comparing, by at least one computer processor, the retrieved first set of television program data in the EPG of the new service provider for television programming provided on the plurality of television channels of the new service provider to the second set of television program data for television programming provided on the requested television channel of the previous service provider; and
in response to the comparing, determining, by at least one computer processor, which one of the plurality of television channels of the new service provider matches the requested television channel of the previous service provider based on the comparison of the retrieved first set of television program data for television programming provided on the plurality of television channels of the new service provider to the second set of television program data for television programming provided on the requested television channel of the previous service provider; and
in response to the determining, retrieving, by at least one computer processor, a channel identifier for the one of the plurality of television channels of the new service provider that matches the requested television channel of the previous service provider, the channel identifier associated with a first service provider that is the new service provider which provides access to the plurality of television channels.

2. The method of claim 1 wherein the at least one computer processor includes a computer processor of the television navigation device.

3. The method of claim 2 wherein the television navigation device is one or more of: a digital video recorder, a media player, a streaming media player, a set-top box, a mobile device, a tablet computing device, a computer, a remote control device, and a smart television.

4. The method of claim 2 wherein the channel identifier and the first set of television program data are retrieved from one or more of: the first service provider and another television navigation device via a server at a location remote from the television navigation device.

5. The method of claim 1 wherein the channel identifier and the first set of television program data are retrieved from a receiving device that is in operable communication with the first service provider and that is coupled to a presentation device.

6. The method of claim 5 wherein one or more of the comparing and the determining are performed by a server computer at a location remote from the receiving device.

7. The method of claim 5 wherein a portion of one or more of the comparing and the determining is performed by a server computer at a location remote from the receiving device and another portion of the one or more of the comparing and the determining is performed at the television navigation device coupled to the receiving device at a location of the receiving device.

8. The method of claim 5 further comprising retrieving, by at least one computer processor, the second set of television program data for television programming provided on the requested television channel from a server computer at a location remote from the receiving device.

9. The method of claim 1 further comprising:
after retrieving the channel identifier for the one of the plurality of television channels that matches the requested television channel, sending a signal to tune to the one of the plurality of television channels using the retrieved channel identifier.

10. The method of claim 9 wherein the sending a signal to tune to the one of the plurality of television channels using the retrieved channel identifier includes sending a signal to a receiving device in operable communication with the first service provider that causes the receiving device to tune to the one of the plurality of television channels using the retrieved channel identifier.

11. The method of claim 10 further comprising:
receiving from the receiving device, by at least one computer processor, television program content being broadcast on the one of the plurality of television channels; and
recording the received television program content.

12. The method of claim 11 further comprising:
before the retrieving the first set of television program data:
receiving, by at least one computer processor, a request to record the requested television channel at a particular time;
setting, by at least one computer processor, a timer to send a signal to tune to the requested television channel using a channel identifier of the requested television channel; and
before the particular time, determining, by at least one computer processor, whether a current service provider that provides access to the requested channel has changed to the new service provider; and
in response to a determination that the current service provider that provides access to the requested channel has changed to the first service provider, performing: the retrieving the first set of television program data, the comparing, the determining which one of the plurality of television channels of the new service provider matches the requested television channel of the previous service provider and the retrieving the channel identifier for the one of the plurality of television channels of the new service provider that matches the requested television channel of the previous service provider.

13. The method of claim 12 further comprising:
at the particular time, sending a signal to tune to the one of the plurality of television channels of the new service provider that matches the requested television channel of the previous service provider using the retrieved channel identifier for the one of the plurality of television channels of the new service provider.

14. The method of claim 1 wherein the first set of television program data in the EPG of the new service provider for television programming provided on the plurality of television channels of the new service provider includes one or more of: program titles for programs broadcast on the plurality of television channels; start times for programs broadcast on the plurality of television channels; end times for programs broadcast on the plurality of television channels; descriptions for programs broadcast on the plurality of television channels; duration of programs broadcast on the plurality of television channels; actors for programs broadcast on the plurality of television channels; series identification for programs broadcast on the plurality of television channels; episode identification for programs broadcast on the plurality of television channels; season identification for programs broadcast on the plurality of television channels; original air date for programs broadcast on the plurality of television channels; and parental control information for one or more for programs broadcast on the plurality of television channels.

15. The method of claim 1 wherein the comparing includes:
comparing program titles and program start times for programs broadcast on the plurality of television channels of the new service provider to program titles and program start times for programs broadcast on the requested television channel of the previous service provider until a television channel of the plurality of television channels of the new service provider is found that has program titles and program start times that match the program titles and program start times for programs broadcast on the requested television channel of the previous service provider.

16. The method of claim 1 wherein the first set of television program data for television programming provided on the plurality of television channels of the new service provider includes information regarding future programming schedule information for the television programming on each of the plurality of television channels of the new service provider.

17. The method of claim 1 wherein the requested television channel is a previously saved favorite.

18. A system comprising:
a computer processor; and
a memory coupled to the processor having computer executable instructions stored thereon, that when executed by the computer processor, cause the computer processor to:
search, by at least one computer processor, for a television channel program lineup in an electronic program guide (EPG) of a new service provider that matches a television channel program lineup that a television navigation device expects to be on the television channel based on a previous service provider by at least:
retrieving a first set of television program data in the EPG of the new service provider for television programming provided on a first plurality of television channels of the new service provider;

comparing the retrieved first set of television program data for television programming provided on the first plurality of television channels of the new service provider to a second set of television program data for television programming provided on a second plurality of television channels of the previous service provider;

determining which channels of the first plurality of television channels of the new service provider matches which channels of the second plurality of television channels of the previous service provider based on the comparison; and retrieving channel identifiers for the channels of the first plurality of television channels of the new service provider that match channels of the second plurality of television channels of the previous service provider, the channel identifiers associated with a first service provider that is the new service provider which provides access to the first plurality of television channels of the new service provider; and change from using previous channel identifiers for tuning to the second plurality of television channels of the previous service provider to using the channel identifiers for the channels of the first plurality of television channels of the new service provider that match channels of the second plurality of television channels of the previous service provider for tuning to the second plurality of television channels.

19. The system of claim 18 wherein the comparison is a comparison of at least program titles of the television programming provided on the first plurality of television channels of the new service provider to program titles of the television programming provided on the second plurality of television channels of the previous service provider.

20. The system of claim 18 wherein the computer executable instructions, when executed by the computer processor, cause the computer processor to send a signal to a receiving device to tune to the second plurality of television channels of the previous service provider, when each of the second plurality of television channels of the previous service provider is requested, using the channel identifiers for the channels of the first plurality of television channels of the new service provider that match channels of the second plurality of television channels of the previous service provider based on the comparison.

21. A non-transitory computer-readable storage medium having computer executable instructions thereon, that when executed by at least one computer processor, cause the following method to be performed:

searching, by at least one computer processor, for a television channel program lineup in an electronic program guide (EPG) of a new service provider that matches a television channel program lineup that a television navigation device expects to be on the television channel based on a previous service provider by at least:

receiving a request to initialize access to a plurality of television channels of the previous service provider;

in response to the request, sending a request for television channel schedule data of the new service provider and corresponding television channel identifiers for television channels provided by the new service provider;

receiving television channel schedule data of the new service provider and corresponding television channel identifiers for television channels provided by the new service provider in response to the request; and comparing the received television channel schedule data of the new service provider to television channel schedule data for the plurality of television channels of the previous service provider to determine which of the television channels provided by the new service provider correspond to which television channels of the plurality of television channels of the previous service provider; and using the television channel identifiers for television channels provided by the new service provider to tune to the corresponding television channels of the plurality of television channels of the previous service provider based on the determination of which of the television channels provided by the new service provider correspond to which television channels of the plurality of television channels of the previous service provider.

22. The non-transitory computer-readable storage medium of claim 21 wherein the comparing the received television channel schedule data of the new service provider to television channel schedule data for the plurality of television channels of the previous service provider includes comparing one or more of: program titles; start times for programs; end times for programs; descriptions of programs; duration of programs; actors for programs; series identification for programs; episode identification for programs; season identification for programs; original air date for programs; and parental control information for programs or television channels.

23. The non-transitory computer-readable storage medium of claim 22 wherein the programs include one or more of: television shows, streaming media content, movies, on demand programs, pay-per-view programs, music, video, and audio programming.

24. A non-transitory computer-readable storage medium having computer executable instructions thereon, that when executed by at least one computer processor cause the following to be performed:

receiving a request to initialize access to a plurality of television channels;

in response to the request, sending a request for television channel schedule data and corresponding television channel identifiers for television channels provided by a service provider;

receiving television channel schedule data and corresponding television channel identifiers for television channels provided by the service provider in response to the request;

comparing the received television channel schedule data to television channel schedule data for the plurality of television channels to determine which of the television channels provided by the service provider correspond to which television channels of the plurality of television channels;

using the television channel identifiers for television channels provided by the service provider to tune to the corresponding television channels of the plurality of television channels based on the determination of which of the television channels provided by the service provider correspond to which television channels of the plurality of television channels;

determining a signal quality level of one or more of television channels provided by the service provider by analyzing a signal of the one or more of television channels;

determining whether the one or more of television channels provided by the service provider corresponds one or more television channels of the plurality of television channels additionally based on whether the determined signal quality level of the one or more of television channels provided by the service provider matches a signal quality level of the one or more television channels of the plurality of television channels; and wherein the using the television channel identifiers for television channels provided by the service provider to tune to the corresponding television channels of the plurality of television channels is further based on whether the determined signal quality level of the one or more of television channels provided by the service provider matches a signal quality level of the one or more television channels of the plurality of television channels.

25. The non-transitory computer-readable storage medium of claim 24 wherein the signal quality level includes one or more of: digital video format, digital video resolution, video aspect ratio, number of pixels, bandwidth requirements, signal speed, connection speed requirements, video signal refresh rate, frame rate, dynamic range and color space.

26. The non-transitory computer-readable storage medium of claim 24 wherein the using the television channel identifiers for television channels provided by the service provider to tune to the corresponding television channels includes one or more of: using the television channel identifiers to select from one or more IP multicast datastreams and using the television channel identifiers to connect to a URL that streams content.

\* \* \* \* \*